Oct. 1, 1963    H. B. YEREX ETAL    3,105,433
VACUUM MEAT PRESSING APPARATUS
Filed Oct. 28, 1960    4 Sheets-Sheet 1
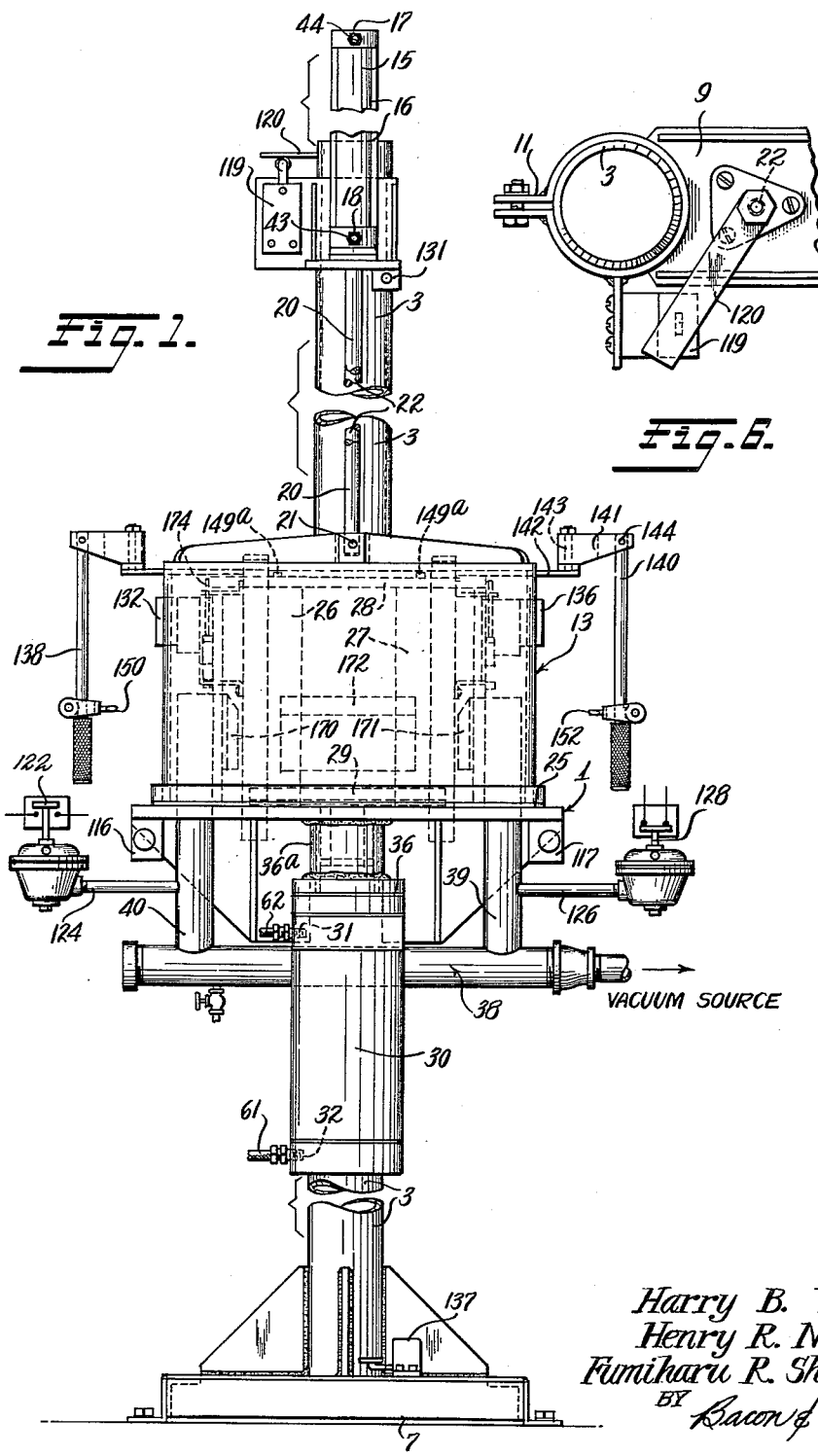
INVENTORS
Harry B. Yerex
Henry R. Nordin
Fumiharu R. Shiozaki
BY Bacon & Thomas
ATTORNEYS

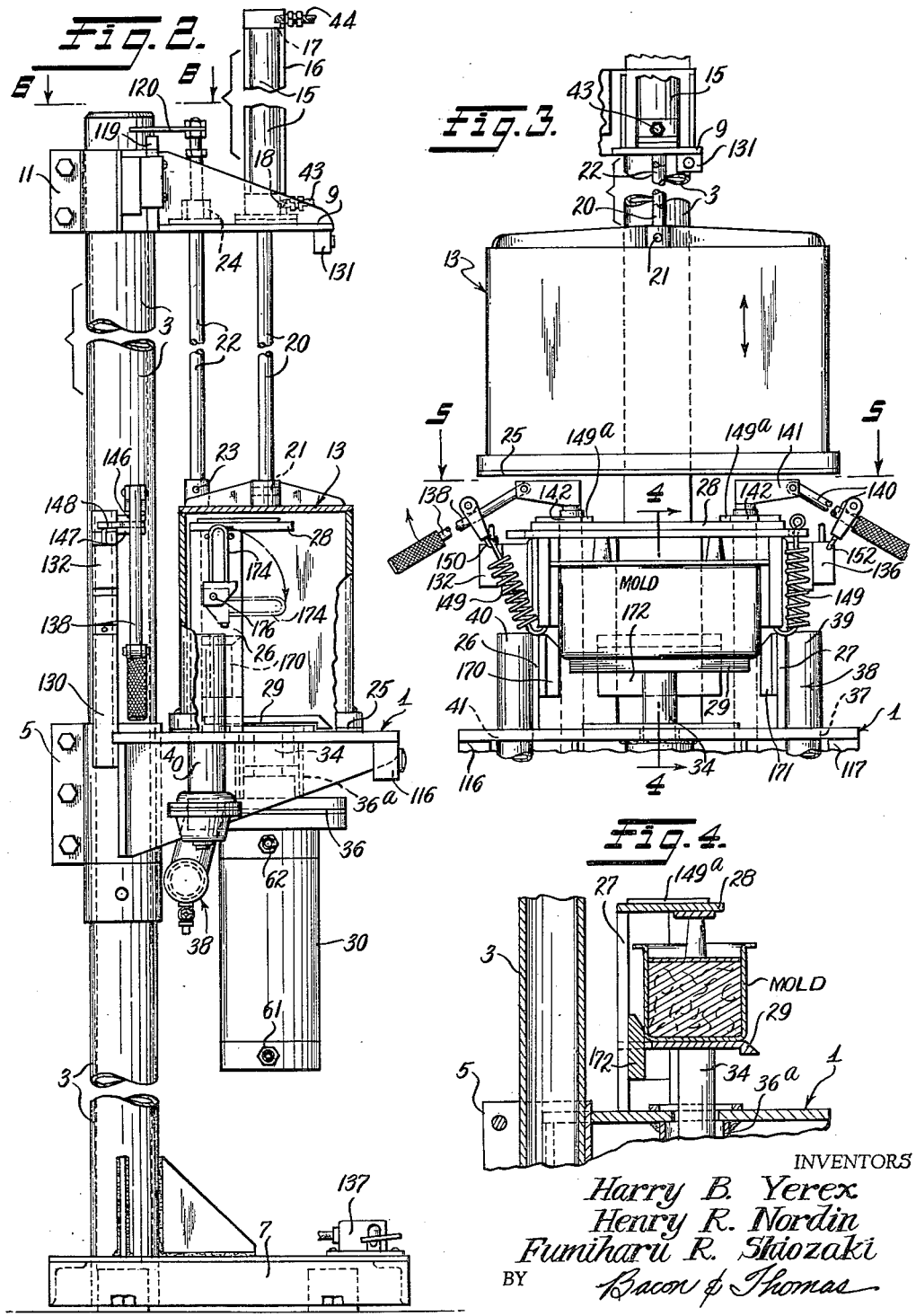

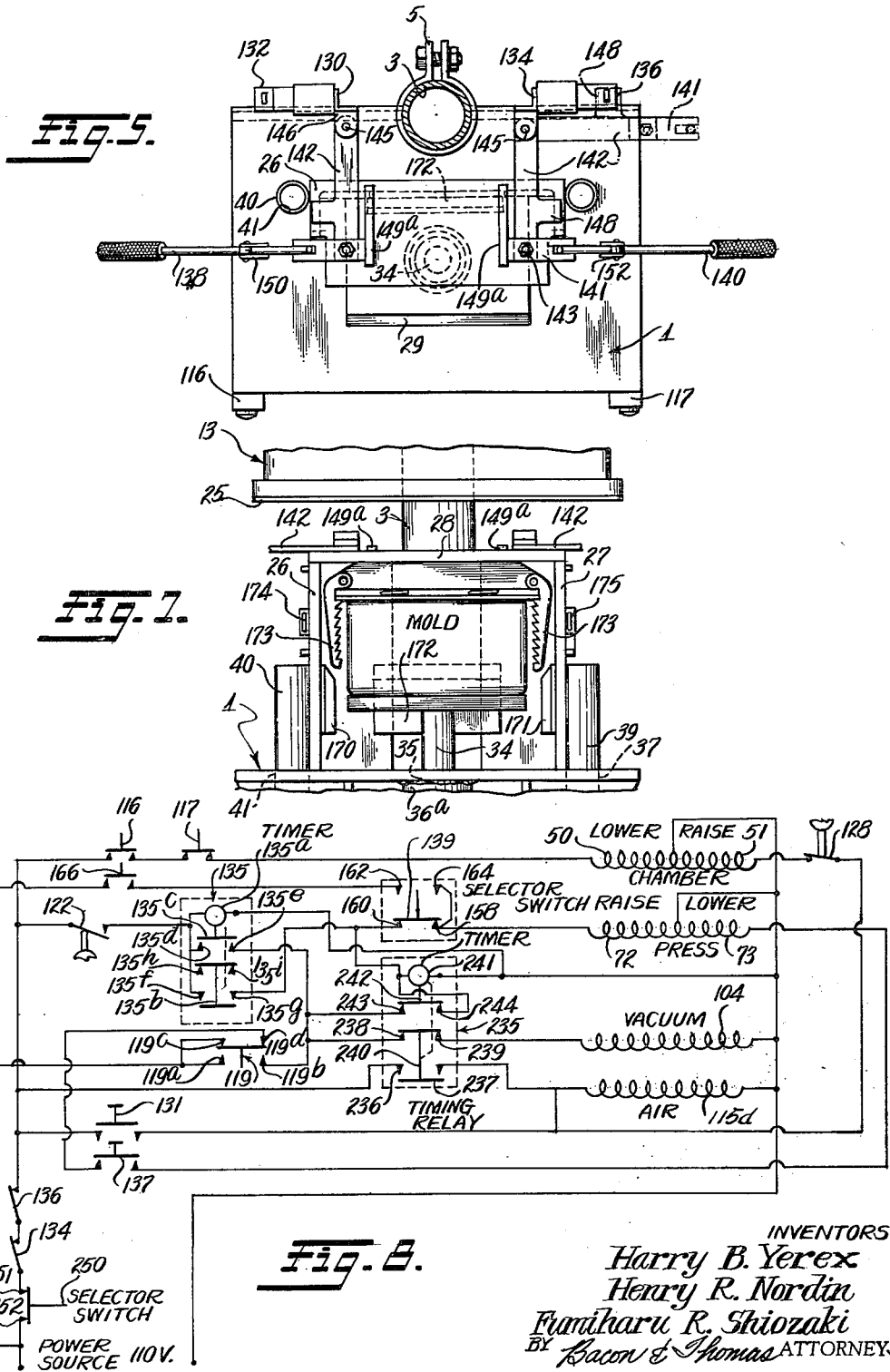

INVENTORS
Harry B. Yerex
Henry R. Nordin
Fumiharu R. Shiozaki
BY Bacon & Thomas
ATTORNEYS

United States Patent Office 3,105,433
Patented Oct. 1, 1963

3,105,433
VACUUM MEAT PRESSING APPARATUS
Harry B. Yerex, Toronto, Ontario, Henry R. Nordin, Maple, Ontario, and Fumiharu R. Shiozaki, Weston, Ontario, Canada, assignors to Canada Packers Limited, Toronto, Ontario, Canada
Filed Oct. 28, 1960, Ser. No. 65,787
12 Claims. (Cl. 100—53)

This invention relates to an improved apparatus for pressing meat products in a mold and, more specifically, to improvements in the pressing of boned, cured ham, or other meat cuts, in a mold whereby after cooking and removal from the mold a product of better slicing quality is obtained.

In preparing boiled ham or the like, it has been conventional practice to place the boned meat in a mold which is open at the top or end and to then press a cover member into the open portion of the container to compress the meat. The meat is then cooked in the mold, preferably while spring tension is applied to the cover member, and when the meat is removed from the mold after cooking, it retains the shape of the mold. Molds of the type utilized are disclosed, for example, in the patents to Adelmann, 2,051,360 and Hoy, 2,431,253.

The processing of cured ham will be utilized in the following description as illustrative. It will be understood, however, that the invention is not limited to this meat product. In the conventional process, the bone is removed from a cured ham and the fat and gristle are trimmed therefrom. In order to make the ham of more equal size from end to end, the shank end may be folded into the cavity formed by the removal of the bone. The ham is then placed in the mold, the cover is applied and forced downwardly into contact with the ham by means of a conventional press. Sufficient pressure is applied to the cover to compress the ham and to shape it to the contour of the inner surface of the mold. Spring means associated with the cover maintain the ham under pressure after removal of the mold from the press. The mold, with the ham under spring pressure therein, is then placed in a water bath and cooked. After removal of the mold from the water bath and chilling, the spring pressure is released and the cover removed. When the ham is removed from the mold, which may be rectangular, square, pear-shaped, or any other desired configuration, it is in the form of the mold employed and will maintain this shape indefinitely. Pressed cooked ham which has been prepraed in this manner is sometimes sliced and placed in transparent packages for sale to the public. It is, therefore, desirable that the packages present an attractive appearance with the slices uniform and unbroken.

One of the most serious problems of cooked ham operations is the presence of holes and jelly pockets in the body of the product. It seems that very little improvement in this respect is obtained by increasing the pressure applied during molding. It is our belief that air is trapped within the ham during the pressing operation and that this air expands when the pressure is released and during cooking. Air spaces are thereby created which can fill with jelly. These spaces occur in the bone cavity and loosely associated parts which in some instances may be connected by tissues or membrane. In the cooking operation, fluids which are liberated within the ham fill some of the spaces. After the ham is cooked and chilled, the fluids solidify in the cavities and between the parts in the form of jelly pockets and layers. The jelly has little strength for securing the various portions of the ham together and, therefore, the bond formed between the walls of the cavities and between other loosely associated or severed portions of the ham during the pressing and cooking operations is weak and unsatisfactory.

As the cooked ham is cut into slices and during subsequent handling, there is a tendency of the slices to break because of the poor bond formed between the walls of the cavities in the ham and between other loosely associated or severed parts thereof and because of the jelly and air pockets formed within the ham. The broken slices or those containing jelly or air pockets do not present an attractive appearance when packaged and must be removed during the packaging operation if a high quality product is to be marketed. This slows down the packaging operation and results in labor losses as well as in product wastage.

In accordance with the present invention, the jelly and air pockets are substantially eliminated and a strong bond formed between the walls of the cavities and between the loosely associated or severed portions of the pressed cooked ham by first subjecting the ham in the mold to vacuum for a short period of time to withdraw from within the ham substantially all of the air and, while maintaining the ham under vacuum, by then applying the pressure of a press to the mold to compress and mold the ham and to press the walls of the cavities and other loosely associated or severed parts thereof tightly together. The application of vacuum is then discontinued while pressure is maintained on the cover member of the mold to keep the ham under compression, and the pressure of the atmosphere surrounding the mold is returned to normal. Continuous pressure is maintained on ham in the mold upon the removal of the mold and ham from the press by springs which press the cover downwardly into the mold. These springs are attached to the cover member while the cover and ham within the container are still under the molding pressure.

The ham, which is then cooked in the mold under spring pressure in the usual manner, is found to be relatively free from jelly and air pockets and the walls of the cavities and other loosely associated or severed parts thereof are securely bonded together. Pressed, cooked ham prepared in this improved manner may be sliced and packaged with much less tendency of the slices to break than ham prepared in the conventional manner. Waste is cut down, packaging efficiency is improved, and a higher quality sliced product is obtained.

It is, therefore, an object of this invention to provide an apparatus to be used in carrying out a method for eliminating air and jelly pockets from within cooked, boned ham and similar products.

Another object of this invention is to provide an apparatus to be used in carrying out a method for producing a molded ham product which is homogeneous and compact throughout and possesses improved slicing qualities.

Another object is to provide an apparatus to be used in carrying out a method for forming a strong bond between the walls of the cavities in molded, boned ham and between loosely associated or severed portions thereof.

Another object is to provide an apparatus to be used in carrying out an improved method for molding boned ham in such a manner that when the ham is cooked and then sliced, it can be packaged with greater efficiency and with less waste.

Another object is to provide apparatus for applying vacuum and compressional force to material in a mold and for permitting free access to said mold after the vacuum is broken but while the compressional force is maintained.

Another object is to provide apparatus for forming boned ham into a compact, homogeneous mass which, after cooking, can be sliced and packaged without substantial breakage.

Another object is to provide vacuum meat-pressing apparatus which will, upon manual starting of the operating cycle, automatically remove air or other gas from within meat contained in a mold, press the meat in the mold, and maintain molding pressure on the meat until auxiliary pressure means can be substituted for the molding pressure.

Another object is to provide means for automatically controlling vacuum-pressing apparatus which will achieve the objects set forth above.

These and other objects and advantages of the invention will become more apparent from the following specification taken in connection with the drawings in which:

FIG. 1 is a front elevation of the vacuum press of the present invention;

FIG. 2 is a side elevation of the press as viewed from the left of FIG. 1 with the vacuum chamber partially broken away, for clarity of illustration;

FIG. 3 is a fragmentary front elevation of the press in one stage of its operation wherein the vacuum chamber is in raised position and a meat mold is being retained under molding pressure while spring-loading means are applied to the cover;

FIG. 4 is a fragmentary vertical sectional view substantially on the line 4—4 of FIG. 3;

FIG. 5 is a horizontal sectional view substantially on the line 5—5 of FIG. 3;

FIG. 6 is an enlarged horizontal sectional view substantially on the line 6—6 of FIG. 2;

FIG. 7 is a fragmentary front elevational view similar to FIG. 3, showing a modified form of meat-pressing mold in the pressing mechanism;

FIG. 8 is a circuit diagram of electrical control means for the meat press; and

Figure 9:
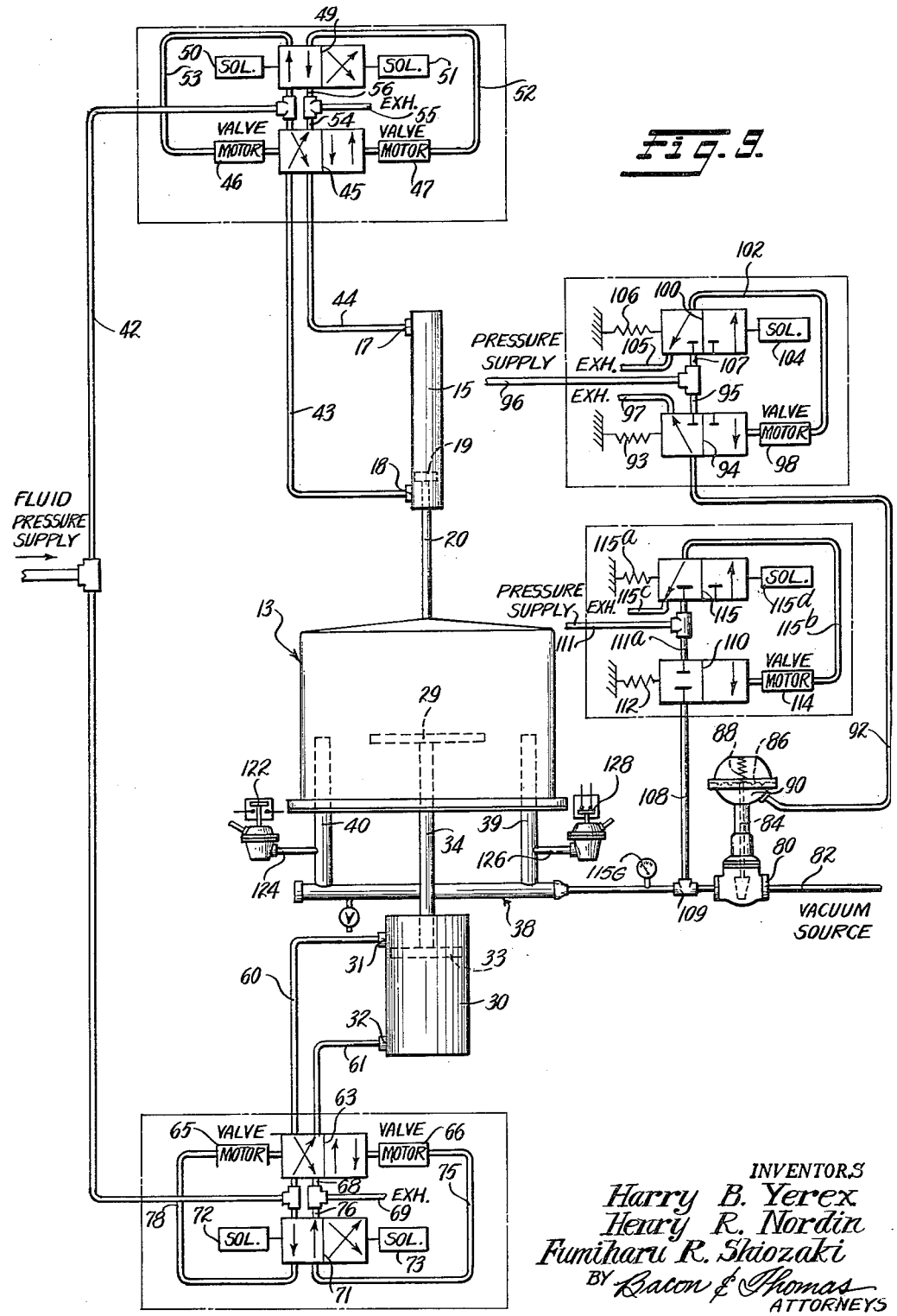
FIG. 9 is a diagrammatic view showing the press and the associated control mechanism for automatically carrying out a cycle of vacuum and pressing operations.

The press, as best shown in FIGS. 1 and 2 of the drawings, includes a flat support or table 1 which is adjustably mounted on a vertical column 3 by means of a clamp 5 (FIG. 2) attached, as by welding, to the rear portion of table 1. A base 7 is rigidly attached to column 3 and supports the column as well as the remainder of the press mechanism. A support arm 9 is positioned above table 1 and is adjustably attached to column 3 by means of a clamp 11 (FIG. 2), welded to the rearward end of support arm 9. A vacuum chamber 13 is disposed between table 1 and support arm 9 and is adapted to be reciprocated in a vertical direction by means of fluid motor 15 which is secured to the upper surface of support arm 9.

Fluid motor 15 includes cylinder 16, with threaded openings 17 and 18 at the upper and lower ends, respectively, to which a source of operating fluid under pressure is attached. Piston 19 (FIG. 9) of fluid motor 15 is connected to one end of piston rod 20 which extends through an opening in the lower end wall of cylinder 16 and through an opening in support arm 9. The other end of piston rod 20 is securely attached to the center portion of the top of vacuum chamber 13 by dowel pin 21. In order to assist piston rod 20 in guiding vacuum chamber 13 for vertical movement and to provide a more rigid support structure therefor, a guide rod 22 is securely attached to the rear central portion of the top of vacuum chamber 13 by a dowel pin 23. The guide rod 22 extends upwardly, parallel to piston rod 20, and passes through an opening formed in arm 9 and through a bearing 24 (FIG. 2), which is attached to the upper surface of support arm 9. Attached to the lower edge surface of vacuum chamber 13 is an annular rubber gasket 25 which is adapted to seal the vacuum chamber when it is lowered into contact with table 1.

A pair of vertically disposed angle-iron supports 26 and 27 are rigidly attached at one end to the upper surface of table 1 and at the other end to a horizontally disposed stop 28. Positioned between table 1 and stop 28 is a press head 29, which is adapted to be reciprocated vertically between the table and stop by a fluid motor 30 attached to the lower surface of table 1. Threaded openings 31 and 32 are formed in the upper and lower ends, respectively, of fluid motor 30 for attachment to a source of operating fluid under pressure. The piston 33 (FIG. 9) of fluid motor 30 is connected to one end of piston rod 34 which passes through an opening 35 in table 1 while the other end of piston rod 34 is rigidly attached to press head 29. A fluid-tight seal 36 is provided between the motor housing and motor mounting member 36a, which provides a sealed passage for rod 34.

A horizontally disposed manifold 38, positioned below table 1, communicates with the interior of vacuum chamber 13, when the chamber is lowered into contact with table 1, by means of vertically extending tubular extensions 39 and 40, which pass through openings 37 and 41, respectively, provided in table 1. Tubular extensions 39 and 40 extend a short distance above the upper surface of table 1 to avoid the entrance of any material on the table into the vacuum line, and are sealed in openings 37 and 41 to prevent the passage of air between the openings and the walls of the tubular extensions and to support the tubular extensions and manifold 38 on table 1.

As shown in FIG. 9, fluid motor 15, which is actuated to reciprocate vacuum chamber 13 into and out of contact with table 1, is connected for operation to a suitable source of fluid under pressure, not shown, by conduit 42 and fluid passages 43 and 44. A reciprocating, 4-way main valve 45, of conventional construction which is schematically shown in FIG. 9, controls the flow of operating fluid in passages 43 and 44, and thus the actuation of fluid motor 15.

Main valve 45 is adapted to be moved to the right by means of a pressure-fluid operable valve motor 46 and to the left by means of a pressure-fluid operable valve motor 47. As illustrated in FIG. 9, valve motor 46 is actuated and main valve 45 is in the right-hand position to connect fluid passage 44 with the source of fluid under pressure in conduit 42. This will cause piston 19 of fluid motor 15 to move downwardly in cylinder 16 and thus lower vacuum chamber 13 into sealing contact with the table 1. At this time the portion of fluid motor 15 below piston 19 is connected to exhaust through fluid passage 43, main valve 45 and exhaust passages 54 and 55.

When valve motor 47 is actuated, main valve 45 will be moved to the left to connect fluid passage 43 with the source of fluid under pressure in conduit 42. This will cause piston 19 to move upwardly and thus raise vacuum chamber 13 to its uppermost position out of contact with table 1. At this time the portion of fluid motor 15 above piston 19 is connected to exhaust through fluid passage 44, main valve 45 and exhaust passages 54 and 55.

A reciprocating, 4-way pilot valve 49, of any conventional construction, which is schematically illustrated in FIG. 9, controls the flow of fluid under pressure to actuate either valve motor 46 or valve motor 47 and thus the actuation of main valve 45, as described above. The 4-way pilot valve 49 is moved to the right-hand position by means of solenoid 50 and to the left-hand position by means of solenoid 51. As shown in FIG. 9, the solenoid 50 is actuated and pilot valve 49 is in the right-hand position to connect valve motor 46 to the source of fluid under pressure in conduit 42 by way of fluid passage 53. Main valve 45 is moved to the right-hand position thereby causing vacuum chamber 13 to be lowered into sealing contact with table 1. In this position, pilot valve 49 connects valve motor 47 to exhaust through passage 42 and discharge passages 56 and 55.

Actuation of solenoid 51 will move pilot valve 49 to the left to connect valve motor 47 to the source of fluid under pressure in conduit 42 by way of fluid passage 52. Main valve 45 will be moved to the left-hand position, thereby causing vacuum chamber 13 to be raised to the uppermost position. In this position, pilot valve 49 connects valve motor 46 to exhaust through passage 53 and discharge passages 56 and 55.

Fluid motor 30, which is actuated to reciprocate press head 29 between stop 28 and table 1, is connected to the source of fluid under pressure in conduit 42 by fluid passages 60 and 61. The controls for fluid motor 30 are similar to those described above for controlling fluid motor 15. A reciprocating, 4-way main valve 63, which is schematically shown in FIG. 9, controls the flow of fluid in passages 60 and 61, and thus the actuation of fluid motor 30. Main valve 63 is moved to the right by means of pressure-fluid operable valve motor 65 and to the left by means of pressure-fluid operable valve motor 66. As illustrated in FIG. 9, valve motor 65 is actuated and main valve 63 is in the right-hand position to connect fluid passage 61 with the source of fluid under pressure in conduit 42. This will cause piston 33 of fluid motor 30 to move upwardly and thus move press head 29 toward stop 28. At this time the portion of fluid motor 30 above piston 33 is connected to exhaust through passage 60, main valve 63 and exhaust passages 68 and 69.

When valve motor 66 is actuated, the main valve 63 will be moved to the left to connect fluid passage 60 with the source of fluid under pressure in conduit 42. This will cause piston 33 to move downwardly and thus move press head 29 in a direction away from stop 28. Press head 29, when in its lowermost position, is slightly spaced above table 1. At this time the portion of fluid motor 30 below piston 33 is connected to exhaust through fluid passage 61, main valve 63 and exhaust passages 68 and 69.

A reciprocating, 4-way pilot valve 71, which is schematically illustrated in FIG. 9, controls the flow of fluid under pressure to actuate either valve motor 65 or valve motor 66 and thus the actuation of main valve 63, as described above. The 4-way pilot valve 71 is moved to the right-hand position by means of solenoid 72 and to the left-hand position by means of solenoid 73. As shown in FIG. 9, the solenoid 72 is actuated and pilot valve 71 is in the right-hand position to connect valve motor 65 to the source of fluid under pressure in conduit 42 by way of fluid passage 78. Main valve 63 is moved to the right-hand position thus causing press head 29 to be moved upwardly in a direction toward stop 28. In this position, pilot valve 71 connects valve motor 66 to exhaust through passage 75 and discharge passages 76 and 69.

Actuation of solenoid 73 will move pilot valve 71 to the left to connect valve motor 66 to the source of fluid under pressure in conduit 42 by way of fluid passage 75. Main valve 63 will be moved to the left-hand position, thus causing press head 29 to be lowered to a position adjacent table 1. In this position, pilot valve 71 connects valve motor 65 to exhaust through passage 78 and discharge passages 76 and 69.

When the vacuum chamber 13 is lowered into sealing contact with table 1, the interior of chamber 13 may be either connected to a source of vacuum or vented to the atmosphere by means of suitable controls. As shown in FIG. 9, the controls for connecting vacuum chamber 13 to a source of vacuum include valve 80, which is positioned in vacuum line 82 between a source of vacuum, which is not shown, and vacuum chamber 13. Valve 80 is moved between open and closed position by means of reciprocating valve stem 84, which is attached to diaphragm 86. Spring 88 urges diaphragm 86 and valve stem 84 in a downward direction to maintain valve 80 in a normally closed position. In order to move diaphragm 86 and valve stem 84 upwardly and thus to control the opening of valve 80, fluid under pressure may be applied to the lower surface of diaphragm 86. A closed housing 90 supports diaphragm 86 and is connected to a source of control fluid under pressure by means of fluid passage 92, a 2-way reciprocating valve 94 of conventional construction, which is schematically shown, in FIG. 9, and fluid passages 95 and 96. Fluid passage 96, which supplies fluid under pressure to the lower surface of diaphragm 86 to operate valve 80, may be connected to the source of fluid under pressure in conduit 42.

As illustrated in FIG. 9, control valve 94 is urged to the right-hand position by means of compression spring 93, thereby connecting housing 90 below the diaphragm 86 to exhaust through fluid passage 92, valve 94, and exhaust passage 97. With the control valve 94 in this position, valve 80 is closed. Control valve 94 may be moved to the left by means of pressure-fluid operable valve motor 98 to connect chamber 90 to the source of fluid under pressure in conduit 42 through fluid passages 96 and 95, and fluid passage 92. When control valve 94 is in the left-hand position, connecting chamber 90 to the source of fluid under pressure, diaphragm 86 and valve stem 84 are moved upwardly by the fluid under pressure to open valve 80 in vacuum line 82 to connect vacuum chamber 13 to the source of vacuum.

A reciprocating 2-way pilot valve 100 of conventional design, which is schematically shown in FIG. 9, controls the flow of fluid under pressure to valve motor 98 and thus the actuation of vacuum valve 80, as described above. Pilot valve 100 is shown urged to the right-hand position by compression spring 106, thus connecting valve motor 98 to exhaust through fluid passage 102, and exhaust passage 105. Actuation of solenoid 104 will move pilot valve 100 to the left against the action of compression spring 106 to connect valve motor 98 with the source of fluid under pressure, which is supplied through fluid passages 96 and 107 and fluid passage 102, thus actuating valve 94 and causing vacuum valve 80 to open.

In order to quickly restore normal atmospheric pressure to vacuum chamber 13 after the chamber has been connected to a source of vacuum, a pipe 108, which communicates with a source of air under pressure in pipe 111, is connected to vacuum line 82, between valve 80 and vacuum chamber 13, by means of a T connection 109. A reciprocating valve 110 of conventional construction, which is schematically shown in FIG. 9, controls the flow of air in pipe 108, and as illustrated in FIG. 9, the valve 110 is urged by compression spring 112 to a right-hand position where it is closed. Valve 110 may be moved to a left-hand open position against the action of spring 112 by means of a pressure-fluid operable valve motor 114 which is attached thereto. It is desirable to actuate valve motor 114, as well as the previously mentioned valve motors 46, 47, 65, 66 and 98 from the same source of fluid under pressure, and it has been determined that by furnishing air in conduit 42 under a pressure of approximately 80 pounds per square inch, that these valve motors and also fluid motors 15 and 30 and valve 80 will operate in a satisfactory manner. The pipe 111 may be connected to the source of air under pressure in conduit 42 and when valve 110 is moved into the left-hand position by means of valve motor 114, the valve 110 will be open and the interior of vacuum chamber 13 will communicate with the conduit 42 through pipes 111, 111a, valve 110, lines 108 and 82, manifold 38 and manifold extensions 39 and 40. By connecting vacuum chamber 13 to a source of air under pressure in this manner, the pressure within the chamber will be returned to normal much more rapidly than would be the case if the chamber were merely vented to the atmosphere and, therefore, a more rapid and efficient operation of the apparatus is effected. It will be understood, however, that venting to atmosphere is within the scope of the present invention. A gauge 115 indicates the pressure in line 82 and enables the automatic operation to be visually checked.

A reciprocating 2-way pilot valve 115 of conventional design, which is schematically shown in FIG. 9, controls the flow of air under pressure to valve motor 114 and thus the actuation of valve 100, as described above. Pilot valve 115 is shown urged to the right-hand closed position by compression spring 115a, thus connecting valve motor 114 to exhaust through fluid passage 115b and exhaust passage 115c. Actuation of solenoid 115d, which in is attached to pilot valve 115, will move pilot valve 115 to the left against the action of compression spring 115a to connect fluid passage 115b and valve motor 114 with the air which is supplied under pressure through pipe 111.

The solenoids which actuate the valves to control operation of fluid motors 15 and 30 and to control the pressure of the atmosphere in vacuum chamber 13, as described above, are included in the electric control circuit for operating the press as shown in FIG. 8. The other electrical controls and switches, which are illustrated in the electric control circuit, control operation of the press as will be described hereinafter and include manually operable push button switches 116 and 117 attached to the front edge of table 1 (FIG. 1), adjacent the left and right sides respectively, thereof, both of which must be depressed simultaneously to begin a cycle of operations.

A limit switch 119, which is attached to the left side of support arm 9 (FIG. 1), adjacent column 3, is automatically actuated by finger 120, fixed to the upper end of guide rod 22 when the vacuum chamber 13 is lowered into sealing contact with table 1, to thereby close the circuit to open vacuum valve 80.

An automatic switch 122, normally spring-urged to an open position and pre-set to be closed when a desired maximum vacuum is present in the vacuum chamber 13, is connected to vacuum manifold extension 40 by means of conduit 124. A switch 128, which is pre-set to be opened by a vacuum well below the desired maximum and which moves to a circuit-closing position when conditions approach atmospheric, is connected to vacuum manifold extension 39 by means of conduit 126. The function of these switches will be more fully described below. A manually operable push button switch 131 is located adjacent the forward end of arm 9. A switch 137 is mounted on base 7 for actuation by the foot of the press operator. A first conventional time delay relay 135 having a double-throw reversing switch and an electrical interlock, is connected in the circuit to control the time limit of the application of vacuum and to provide other timed control functions, as will be described in detail below. A second time delay relay 235, similar in structure to the first timing relay 135, is connected in the cricuit to control the time limit of the actuation of the press under vacuum before the vacuum chamber is vented. Relays 135 and 235 may be of the type illustrated in Schaefer Patent 2,662,594. A conventional, manually operable double-throw selector switch 139 in the control circuit is conveniently located adjacent the press within reach of the operator. By means of the selector switch, the operator may choose between automatic and manual control.

Rigidly attached to the upper surface of table 1, at the left side of column 3, is an angle-iron support bracket 130, which mounts adjacent the upper end thereof a safety switch 132. Similarly attached to the upper surface of table 1 at the right side of column 3, is angle-iron bracket 134, which mounts, adjacent the upper end thereof a second safety switch 136. Switches 132 and 136 are normally maintained in closed position by a portion of a linkage which supports levers 138 and 140, which are adopted to facilitate the spring-loading of the cover members of meat molds of the Hoy type, as will hereinafter be described.

As levers 138 and 140 and the support linkages associated therewith are identical in structure, only lever 140 and the linkage associated therewith will be described in detail. Lever 140 is connected to one end of swinging support arm 142 by means of link 141. Vertically disposed pivot pin 143 passes through the one end of support arm 142 and one end of link 141 to connect the support arm and link. A horizontally disposed pivot pin 144 passes through one end of lever 140 and the other end of link 141, which is bifurcated, to connect the lever and link. The other end of swinging support arm 142 is mounted between spaced lugs 146 and 147, welded adjacent the upper end of angle-iron bracket 134 by means of a vertically disposed pivot pin 145 which passes through support arm 142 and spaced lugs 146 and 147.

As shown in FIG. 3 and in the full lines in FIG. 5, the levers 138 and 140 are in position to apply springs 149 to a meat mold of the Hoy type shown in Patent No. 2,431,-253 mentioned above. In this position they engage limiting elements 149a (FIG. 5) mounted on the top of stop 28. As shown in FIGS. 1 and 2 and in the dotted lines in FIG. 5, levers 138 and 140 are in an inoperative or stowed position, with support arms 142 and links 141 extending parallel to the rear edge of table 1. Support arms 142 have formed integrally therewith an extension 148 which, when the support arms are in a stowed position, are so located as to close switches 132 and 136 to complete the circuit therethrough. When the arms 142 are pulled forward to the operating position under the raised vacuum chamber 13, as shown in FIG. 3, the switches 132 and 136 are open, thereby preventing the energizing of the circuit to lower this chamber until the arms are back out of the way. Slidably mounted on levers 138 and 140 are hooks 150 and 152, respectively, which are adapted to engage the upper ends of springs 149 and thereby attach the springs to the mold.

It has been found that substantially all of the air trapped within a boned, cured ham may be withdrawn within a few seconds when the ham loosely placed in the mold is subjected to a vacuum of approximately 27" of mercury. Longer times may be employed but generally are not necessary. Although a lower or higher vacuum has also been found to be effective to withdraw the air from the interior of boned ham and other meats, a vacuum of approximately 27" of mercury has been found to be the most satisfactory. While maintaining the ham under vacuum, a pressure of approximately 1500 pounds force is applied thereto to compress and mold the ham to the desired shape. This pressure will force the walls of the cavities together and will also force other loosely associated or severed portions tightly together. Pressures in the range of from approximately 500 pounds force up to 5,000 pounds force may be employed. However, the results obtained at about 1500 pounds force are found to be optimum with boned, cured ham. It will be understood that higher or lower pressure within the range specified may be used, depending upon the type of meat pressed, the nature of the particular mold, and other considerations. Improvements are realized by the combined vacuum-pressure operation over the entire range.

It is intended that the apparatus described above may be adapted to press meats in a vacuum in molds of various types, including those of the general type disclosed in either Patent 2,051,360 or Patent 2,431,253, mentioned above. The apparatus may be modified as necessary to suit the particular mold used. Thus, in order to locate on press head 29 a mold of the type shown in the Patent 2,431,253 and in FIGS. 3 and 4 so that it will be properly positioned thereon and to prevent damage to the side walls of vacuum chamber 13, guide blocks 170 and 171 (FIG. 3) are attached to the inner surfaces of support members 26 and 27, respectively. An abutment plate 172 (FIG. 4) is welded between angle-iron support members 26 and 27 in order to limit rearward movement of the mold when it is placed on press head 29 and to further strengthen and rigidify the structure which supports stop 29.

As the pivoted links or hooks 173 which fasten the cover to the type mold shown in the Patent 2,051,360 and in FIG. 7 are sometimes inclined to fly outwardly and possibly contact the inner walls of the vacuum chamber, resilient guides 174 and 175 are pivotally attached at 176 to the outer walls of angle-iron supports 26 and 27, respectively, to limit outward movement of the pivoted links or hooks 173. Guides 174 and 175 are pivoted to a horizontal position, as shown in FIG. 7, when a mold of the type disclosed in the Patent 2,051,360 is to be placed on the press. When other type molds are to be placed on the press, guides 174 and 175 are pivoted to a vertical, stowed position, as guide 174 is shown in solid lines in FIG. 2.

Operation of the apparatus is as follows:

After the ham has been placed in the mold and the cover set loosely in place on top of the mold, the mold is placed on press head 29. In order to provide for automatic operation of the press, selector switch 139 (as shown in FIG. 8) is moved downwardly to complete a circuit across terminals 158 and 160. Switches 134 and 136 are already in closed position if the spring-attaching means including support arms 142 are properly stowed. The remainder of the switches are so positioned that no circuit is yet completed. Pushbutton switches 116 and 117 are simultaneously depressed by the hands of the operator of the press (one hand on each push button), to complete a circuit energizing solenoid 50 to cause vacuum chamber 13 to be lowered over the mold and into sealing contact with table 1 in a manner as described above. Although switch 128 is in normally closed position at this time, the circuit to solenoid 51 is not energized because of the open contacts 236 and 237 in the timing relay 235 and in the manual switch 131.

In order to start the automatic operating cycle of the press, both starting switches 116 and 117 must be momentarily depressed simultaneously to complete a circuit to actuate solenoid 50 to cause vacuum chamber 13 to be lowered into contact with table 1 by means of fluid motor 15, as described above. This constitutes a safety feature by requiring the operator's hands to be on the switches 116 and 117 at the beginning of the operating cycle. As vacuum chamber 13 comes into contact with table 1, finger 120, attached to the upper end of vacuum chamber guide rod 22, actuates limit switch 119 to complete a circuit through contacts 119a and 119b and through contacts 238 and 239 of the reversing switch 240 of timing relay 235, to actuate solenoid 104, controlling operation of the main vacuum valve. As previously described, actuation of solenoid 104 causes vacuum valve 80 to be opened and thus connects the interior of vacuum chamber 13 to the source of vacuum, which preferably is designed to draw a vacuum of at least 27" of mercury. As soon as a slight vacuum is present in chamber 13, automatic switch 128 opens.

When the vacuum in chamber 13 increases to approximately 27 inches of mercury, automatic vacuum-operated switch 122, which has been pre-set for this vacuum, will be actuated to complete a circuit through the energizing coil of timer 135a of time delay relay 135 to reciprocate the armature of the energizing coil and thus actuate the timing mechanism of the timer 135a. Timer 135a is provided with an operator for the double-throw reversing switch 135b and is set so that a period of two or three seconds will elapse after the timer is actuated before the operator will actuate switch 135b. This delay period, after the vacuum in chamber 13 has reached the desired value of approximately 27 inches of mercury and actuated switch 122, is for the purpose of subjecting the ham to approximately 27 inches of vacuum for a sufficient period of time to assure removal of substantially all of the air from within the ham, prior to pressing the ham, and may be varied as deemed desirable. The electrical interlock 135c, which is provided in relay 135, is actuated without delay by the armature of the energizing coil of timer 135a to complete a holding circuit through contacts 119a and 119b of limit switch 119, contacts 135d and 135e of interlock 135c and timer 135a.

After the time delay period is completed, reversing switch 135b is actuated to complete a circuit through vacuum switch 122, contacts 135f and 135g of switch 135b and selector switch 139 to energize solenoid 72 and thus cause press head 29 to move in a direction toward stop 28 in a manner as already described. All of the air will be removed from within the ham by the vacuum prior to operation of the press. As press head 29 moves in a direction toward stop 28, the ham in the mold will be pressed under a pressure of approximately 1500 pounds force between press head 29 and stop 28, as the mold cover is forced downwardly into the mold. The press is set to maintain the maximum pressure desired. The ham is under pressure as shown in FIG. 4.

The actuation of reversing switch 135b also completes a circuit through vacuum operated switch 122, contacts 135f and 135g of switch 135b, and the energizing coil of timer 241 of the time delay relay 235 to reciprocate the armature of the energizing coil and thus actuate the timing mechanism of timer 241. Timer 241 is provided with an operator for the double-throw reversing switch 240 and is set so that a period of approximately two seconds will elapse after the timer is actuated before the operator will actuate switch 240. This delay period, after solenoid 72 is energized to actuate the press, is for the purpose of permitting the press to complete the pressing stroke prior to the venting of vacuum chamber 13 and may be varied as deemed necessary. The electrical interlock 242, which is provided in relay 235, is actuated without delay by the armature of the energizing coil of timer 241 to complete a holding circuit through contacts 119a and 119b of limit switch 119, contacts 243 and 244 of interlock 242 and timer 241.

After the delay period is completed, double-throw reversing switch 240 is actuated to interrupt the circuit through contacts 238 and 239 and to complete a circuit through contacts 236 and 237. This will de-energize solenoid 104 to cause the closing of vacuum valve 80 and will actuate solenoid 115d to connect chamber 13 to a source of air under pressure as described above. As the pressure of the atmosphere in the vacuum chamber 13 becomes normal, vacuum-opened switch 128 closes to complete a circuit through now closed contacts 236 and 237 of relay 235 to energize solenoid 51 to move vacuum chamber 13 into the raised position in a manner previously described. As vacuum chamber 13 moves upwardly out of contact with table 1, finger 120 attached to vacuum chamber guide rod 22 also moves upwardly to permit the circuit through contacts 119a and 119b of limit switch 119 to open. This completes the automatic operating cycle by breaking the holding circuits through the electrical interlocks 135c and 242 of relays 135 and 235 respectively, thus restoring the switches of the relays to the positions shown in the drawing and de-energizing solenoid 115d causing air valve 110 to close. The press is still in its raised position, exerting pressure on the mold as shown in FIG. 4.

It will be noted that the double-throw reversing switch 135b of relay 135 includes one pair of contacts 135h and 135i which are not employed. Relays 135 and 235 are illustrated as being identical in structure and method of operation but it is obvious that a normally open, single-throw switch could be substituted for switch 135b.

If a mold of the type described in the Patent 2,431,253, mentioned above, is employed, springs 149 are attached by means of levers 138 and 140, as shown in FIG. 3, while the mold is maintained under pressure. When levers 138 and 140 are moved from the inoperative position to a position for applying springs 149, the circuit through switches 132 or 136 is interrupted so that neither the vacuum chamber nor the press can be actuated until both levers are restored to the inoperative position. This construction provides a safety feature wherein movement of support arms 142 away from the inoperative position to a position below vacuum chamber 13 opens a switch in the circuit to prevent operation of the motors controlling movement of the vacuum chamber or press. In the event that a mold of the type shown in the Patent 2,051,360, mentioned above, is employed, the cover of the mold is automatically fastened under spring pressure to the degree exerted by the press, as will be apparent from FIG. 7.

Switch 137 is now actuated by the foot of the operator (arms 142 being stowed and maintained in this position by light tension springs so that safety switches 134 and 136 are closed), to complete a circuit to energize solenoid 73, which will cause motor 30 to move press head 29 in a direction away from stop 28, in a manner as described above, to release the mold from the press.

If it is desired to manually operate the press without employing vacuum, the switch 250 is moved to the right to open the circuit employed for automatic operation of the press across terminals 251 and 252 and the selector switch 139 is moved to its upper position to complete a circuit across terminals 162 and 164. During the manual operation of the press, the vacuum chamber 13 remains in the raised position and contacts 119c and 119d of limit switch 119 are closed. A manually operable push button switch 166, conveniently located, is included in the circuit and may be operated to complete the circuit to energize solenoid 72 to raise the press head toward stop 28. Upon release of switch 166 and the actuation of foot-operated switch 137, solenoid 73 will be actuated to cause press head 29 to be moved in a direction away from stop 28.

Switch 131 provides a manual control for energizing solenoid 51 for raising vacuum chamber 13 in the event that it is desired to raise this chamber when the vacuum system fails.

One example for preparing ham with our improved apparatus for subsequent cooking in a mold is set forth below.

*Example*

Hams were placed in "Adelmann" containers with the lid fitting loosely. These were then placed into the vacuum press and a vacuum was drawn (27" Hg). The hams were then pressed at 1500 pounds. Hams from the same curing lot were placed in the same type of container and pressed with the regular plant press at about the same pressure. These hams were then cooked and sliced on the same slicing machine and every tenth slice was rated as good, fair or poor, depending on its slicing quality. The results of the tests conducted are as follows:

| Test No. | | Slicing Quality Rating | | | Slicing Yield | | |
|---|---|---|---|---|---|---|---|
| | | Good, percent | Fair, percent | Poor, percent | Best grade, percent | Second Grade, percent | Trim, percent |
| 1 | Test | 86 | 12 | 2 | 87.6 | 9.0 | 3.4 |
| | Control | 71 | 18 | 11 | 82.8 | 13.8 | 3.2 |
| 2 | Test | 83 | 13 | 4 | 87.0 | 9.7 | 3.3 |
| | Control | 60 | 26 | 14 | 86.5 | 10.5 | 3.0 |

These tests indicate a very definite improvement in slicing quality when hams are pressed under vacuum in the manner described. Substantially no holes or jelly pockets were present in the vacuum-pressed product. The improvement in slicing yield as between the best and second grades resulted from the reduction in breakage. This reduction also improves the packaging efficiency and results in better appearing packaged products.

Although the apparatus disclosed herein has been confined to the preparation of ham for subsequent cooking, it will be apparent to anyone skilled in the art that other comestibles or various other materials may be treated in the manner described and that the press, including the various controls therefor, may be utilized for other purposes.

While a preferred form of the invention has been exemplified, it will be understood that the disclosure is illustrative only and not to be taken in a limiting sense. Various alterations, modifications and substitutions of equivalents, as will occur to those skilled in this art, are to be considered within the scope of the invention.

We claim:

1. Apparatus for pressing meat under vacuum in a mold, comprising: a support table; a stop attached to the top of said table and spaced therefrom; a press head for supporting a mold, positioned between said table and said stop; a vacuum chamber positioned above said table; means to move said chamber downwardly into sealing contact with said table to enclose said stop and said press head therein; means for selectively connecting said chamber to a source of vacuum and to a source of air while said chamber is in contact with said table; means for moving said press head upwardly toward said stop while these elements are enclosed within said vacuum chamber to clamp said mold between said press head and stop and press material contained in said mold; means for moving said vacuum chamber upwardly out of sealing contact with said table and away from said press head and stop while the mold is clamped under pressure therebetween, and means for moving said press head downwardly away from said stop to release said mold.

2. Apparatus for pressing meat under vacuum in a mold, comprising: a support table, a stop attached to the top of said table and spaced therefrom; a press head, for supporting a mold, positioned between said table and said stop; a vacuum chamber positioned above said table; means for moving said chamber into sealing contact with said table to enclose said stop and said press head therein; means to connect said chamber to a source of vacuum; timing means responsive to the attainment of a predetermined vacuum in said chamber to move said press head in a direction toward said stop after said predetermined vacuum has been applied for a set length of time to clamp said mold between said press head and stop and thereby press material contained in said mold; means for disconnecting said chamber from said source of vacuum and for returning said chamber to atmospheric pressure; means for moving said vacuum chamber out of contact with said table; and means for moving said press head away from said stop to thereby release said mold.

3. Apparatus as set forth in claim 2, including a second timing means responsive to the first-mentioned timing means for actuating said means for disconnecting said chamber from said vacuum source and returning said chamber to atmospheric pressure after a set length of time and while said head is engaged.

4. Apparatus as set forth in claim 2, including means responsive to movement of said vacuum chamber into contact with said table for actuating said means for connecting said chamber to said source of vacuum and means responsive to a decrease in vacuum in said chamber as said chamber is returned to atmospheric pressure to actuate said means for moving said chamber out of contact with said table.

5. Apparatus for pressing meat under vacuum in a mold, comprising: a support table; a stop attached to the top of said table and spaced therefrom; a press head positioned between said table and said stop; a vacuum chamber positioned above said table; means for moving said chamber into sealing contact with said table to enclose said stop and said press head therein; means actuated by movement of said chamber into contact with said table for connecting said chamber to a source of vacuum; timing means responsive to a predetermined vacuum in said chamber for maintaining said chamber in connection with said source of vacuum for a predetermined length of time and for actuating means to move said press head in a direction toward said stop to clamp said mold between said press head and stop and press material contained in said mold; means actuated by said timing means for disconnecting said chamber from said source of vacuum and returning said chamber to atmospheric pressure; means responsive to a decrease in vacuum in said chamber as said chamber is returned to atmospheric pressure to actuate means to reciprocate said chamber out of contact with said table and away from said press head and stop, and means to move said press head in a direction away from said stop to release said mold.

6. Apparatus for pressing meat under vacuum in a mold of the type adapted for spring-loading of a cover member, comprising: a support table; a stop attached to the top of said table and spaced therefrom; a press head positioned between said table and said stop and adapted to receive said mold; a vacuum chamber positioned above said table; means to lower said chamber into sealing contact with said table to enclose said stop and said press head therein; means for connecting said chamber to a source of vacuum; means for moving said press head in a direction toward said stop to press said mold between said head and said stop; means for disconnecting said chamber from said source of vacuum and for returning said chamber to atmospheric pressure; means for raising said vacuum chamber out of contact with said table and away from said press head and stop; hand-operated levers pivoted for movement under said raised vacuum chamber for spring loading the cover member of said mold while said mold is under pressure between said press head and stop; and means for moving said press head away from said stop to release said spring-loaded mold.

7. The apparatus set forth in claim 6, including safety switch means in a control circuit governing movement of said vacuum chamber adapted to open upon movement of said hand-operated levers to a position under said vacuum chamber whereby accidental movement of said chamber is avoided.

8. In apparatus for pressing material under a vacuum including a vacuum chamber enclosing a press, control means comprising: a conduit connecting said chamber to a source of vacuum, said conduit having a valve therein; a conduit connecting said chamber to a source of compressed air, said last-mentioned conduit having a valve therein; said first-mentioned valve being open and said second-mentioned valve being closed during the evacuation of said chamber; and means responsive to the attainment of a predetermined vacuum in said chamber for closing the first-mentioned valve thereby disconnecting said chamber from said source of vacuum and for substantially simultaneously opening the second-mentioned valve to thereby connect said chamber to said source of compressed air to immediately return said chamber to atmospheric pressure, whereby said predetermined vacuum is present in said chamber during a pressing operation and is automatically broken.

9. Control means as set forth in claim 8, including timing means for delaying the action of said means responsive to the attainment of a predetermined vacuum for a predetermined time after said vacuum has been attained.

10. In apparatus for pressing material under a vacuum including a vacuum chamber and a press enclosed thereby, control means comprising: means for selectively connecting said chamber to a source of vacuum and to a source of compressed air; timing means actuated by a predetermined vacuum in said chamber for maintaining said connection to said source of vacuum for a predetermined time and then automatically disconnecting said chamber from said source of vacuum and substantially simultaneously connecting said chamber to said source of compressed air to thereby rapidly return said chamber to atmospheric pressure, whereby said predetermined vacuum is present in said chamber during a pressing operation and is automatically broken.

11. Control means as set forth in claim 10 wherein said timing means includes means to automatically actuate said press after said predetermined high vacuum has been applied for a set length of time and before said chamber has been disconnected from said source of vacuum.

12. In apparatus for pressing material under a vacuum including a vacuum chamber and a press adapted to be enclosed thereby, the combination comprising: means for opening and closing said vacuum chamber to provide access to said press; a control circuit including means responsive to the closing of said vacuum chamber for automatically connecting said chamber to a source of vacuum, a pair of time delay relays, a vacuum operable switch responsive to the attainment of a predetermined vacuum in said vacuum chamber to initiate operation of a first of said time delay relays, means responsive to the actuation of said first time delay relay to actuate said press and to initiate operation of said second time delay relay; means responsive to the actuation of the second time delay relay to disconnect said vacuum chamber from said source of vacuum and return said chamber to atmospheric pressure, and a pressure operable switch operable upon return of said chamber to atmospheric pressure to close a circuit to the means for opening said vacuum chamber, whereby said predetermined vacuum is applied to said chamber prior to actuation of said press, said press is actuated, and the vacuum chamber is then returned to atmospheric pressure and opened.

References Cited in the file of this patent

UNITED STATES PATENTS

| 764,926 | Dederick | July 12, 1904 |
| 801,963 | Beaty | Oct. 17, 1905 |
| 1,089,687 | Ziebarth | Mar. 10, 1914 |
| 1,560,862 | Roberts | Nov. 10, 1925 |
| 2,351,058 | Marks | June 13, 1944 |
| 2,528,276 | Hoy | Oct. 31, 1950 |
| 2,607,435 | Dohse | Aug. 19, 1952 |

OTHER REFERENCES

Modern Industrial Press (pages 23, 24), Jan. 1956.